United States Patent
Walrand et al.

(10) Patent No.: US 6,674,760 B1
(45) Date of Patent: Jan. 6, 2004

(54) METHOD AND SYSTEM FOR IMPLEMENTING END-TO-END QOS IN PACKET-SWITCHED NETWORKS

(75) Inventors: Jean Walrand, Berkeley, CA (US); Rajarshi Gupta, Berkeley, CA (US)

(73) Assignee: Extreme Networks, Inc., Santa Clara, CA (US)

(*) Notice: Subject to any disclaimer, the term of this patent is extended or adjusted under 35 U.S.C. 154(b) by 0 days.

(21) Appl. No.: 09/407,205

(22) Filed: Sep. 28, 1999

(51) Int. Cl.$^7$ ................................ H04L 12/56
(52) U.S. Cl. ........................ 370/411; 370/392
(58) Field of Search .................. 370/411, 229, 370/230, 231, 232, 235, 352, 356, 386, 389, 392, 393, 394, 395.1, 395.21, 395.3, 395.4, 395.5, 395.52, 295.53, 400, 401, 455, 465, 471, 474, 475, 468, 469; 709/224, 225, 226, 229, 230, 238

(56) References Cited

U.S. PATENT DOCUMENTS

| | | | |
|---|---|---|---|
| 5,313,454 A | 5/1994 | Bustini et al. | 370/231 |
| 5,361,255 A | 11/1994 | Diaz et al. | 370/374 |
| 5,440,549 A | 8/1995 | Min et al. | 370/394 |
| 5,485,455 A | 1/1996 | Dobbins et al. | 370/255 |
| 5,491,694 A | 2/1996 | Oliver et al. | 370/455 |
| 5,519,698 A | 5/1996 | Lyles et al. | 370/411 |
| 5,526,352 A | 6/1996 | Min et al. | 370/395.4 |
| 5,675,576 A | 10/1997 | Kalampoukas et al. | 370/232 |
| 5,734,486 A | 3/1998 | Guillemot et al. | 359/139 |
| 5,742,772 A | 4/1998 | Sreenan | 709/226 |
| 5,790,546 A | 8/1998 | Dobbins et al. | 370/400 |
| 6,286,052 B1 * | 9/2001 | McCloghrie et al. | 709/238 |
| 6,295,296 B1 * | 9/2001 | Tappan | 370/392 |
| 6,307,837 B1 * | 10/2001 | Ichikawa et al. | 370/230 |
| 6,490,632 B1 * | 12/2002 | Vepa et al. | 709/250 |
| 6,493,317 B1 * | 12/2002 | Ma | 370/237 |
| 6,502,131 B1 * | 12/2002 | Vaid et al. | 709/224 |
| 6,507,577 B1 * | 1/2003 | Mauger et al. | 370/356 |

* cited by examiner

Primary Examiner—Kenneth Vanderpuye
Assistant Examiner—Brian Nguyen
(74) Attorney, Agent, or Firm—Blakely Sokoloff Taylor & Zafman, LLP

(57) ABSTRACT

Disclosed herein is a system and method to implement end-to-end QoS for connections in IP-based networks, even when the communications are between different subnetworks. In accordance with an embodiment of the invention, QoS is provided between subnet routers that are attached to the network through a network backbone. An embodiment of the invention can differentiate connections between routers and can classify data streams for both inter-subnet and intra-subnet connections using only information provided in the IP headers and without requiring any special tags or other identifiers to be added to the packet.

17 Claims, 3 Drawing Sheets

METHOD AND SYSTEM FOR IMPLEMENTING END-TO-END QOS IN PACKET-SWITCHED NETWORKS

FIELD OF THE INVENTION

The invention generally relates to communication networks. More specifically, the invention relates to the implementation of end-to-end quality of service (QoS) in connections over packet-switched networks.

BACKGROUND

In communications technology, there is an ever-increasing demand for high-performance networks. This increased demand has led to the development of improved networks capable of handling larger volumes of data with smaller delays.

Communications networks, such as ATM networks or the Internet, are generally formed with a number of transmission links interconnected with switches. A transmission link is any medium through which signals are communicated and can be single or multiple twisted pairs, optical fiber, coaxial cable, radio links, or other mediums. A switch is a device with one or more input ports and one or more output ports. The switch directs bits arriving at an input port to the appropriate output port. Switching in communications is accomplished using one of two methods: circuit switching and packet switching. Only packet switching is relevant for the purposes of the present discussion.

In packet switching, the data in a data stream is divided into "packets." In addition to a portion of data, each packet carries various identifying information about the data, usually in a header. Such identifying information includes routing information, for instance, source and destination addresses for the data. When a packet arrives at a switch, it is stored in a buffer. The switch looks at the routing information in the packet and routes the packet to the appropriate output port. The packets are then forwarded one "hop" (or switch) at a time, until they reach their destination.

Generally in packet switching, each packet in a particular data stream does not necessarily follow the same path to its destination as the others. Nonetheless, certain types of packet switching, e.g., ATM, do specify the path that the packets are to follow between the switches for a particular end-to-end connection. Such a predetermined path is typically referred to as a "virtual channel" or "virtual connection."

Unlike general packet switching where packets are not guaranteed to arrive in the order they were sent, when virtual channels are specified in ATM, all of the packets follow the same route along the virtual channel, thereby guaranteeing the order of arrival. These "virtual connections" have greatly enhanced the performance of networks in using resources efficiently and can often provide a minimum "quality of service" ("QoS"). "Quality of service" ("QoS") generally refers to guaranteed bounds on the delay, loss rate, available throughput, and/or other measures of performance. Thus, if users' computers are directly connected using an ATM virtual circuit, QoS could be provided end-to-end. Still, ATM is complicated and expensive, and is almost never used to provide QoS to specific user connections.

In contrast, data networks, like those based on the Internet Protocol (IP), were initially designed to provide only "best-effort" delivery services for data packets and do not guarantee packet order of arrival. Still, as the applications of data transmission mature, the need for QoS is increasing, and the trend is to provide some form of QoS. In order to provide QoS, packets need to be associated with a particular class of service, typically indicated with bits in the packet header known as DiffServ bits. Nonetheless, there is only a finite number of classifications identified by these DiffServ bits, usually eight. While some network services that are based upon IP have promised low delays, loss rates, and even available transmission rates, for these data networks, QoS is available only between nodes within a particular subnetwork. QoS is not generally available for end-to-end connections where data travels between subnets, since a given subnetwork cannot distinguish between classes assigned in its own subnetwork or classes assigned in another subnetwork, and there is no universally adopted definition of QoS that the different subnetworks could agree to provide.

SUMMARY

In order to provide end-to-end QoS for both inter- and intra-subnet communications, disclosed herein is a system and method to implement end-to-end QoS for connections in IP-based networks, even when the communications are between different subnetworks. In accordance with an embodiment of the invention, QoS is provided between subnet routers (a type of switch) that are attached to the network through a network backbone. An embodiment of the invention can differentiate connections between router pairs and can classify data streams for both inter-subnet and intra-subnet connections using only information provided in the IP headers and without requiring any special tags or other identifiers to be added to the packet.

Specifically, in accordance with an embodiment of the invention, the first accessed node in a subnetwork that receives an IP packet, classifies the packet based upon the IP destination address, the IP source address, and a class of service identifier. In doing so, the node recognizes which end-to-end connection the packet belongs to. Once classified, the node can allocate the resources necessary or otherwise provide a quality of service for the specific connection classification. Some embodiments of the invention refer to information solely in the IP header while others refer to tags (e.g., MPLS or VLAN) that encapsulate information contained in the IP header. In either case, only information from the IP header is necessary to a classification process in accordance with the invention.

BRIEF DESCRIPTION OF THE DRAWINGS

The present invention is described with respect to particular exemplary embodiments thereof and reference is accordingly made to the drawings in which.

DETAILED DESCRIPTION

Figure 1:
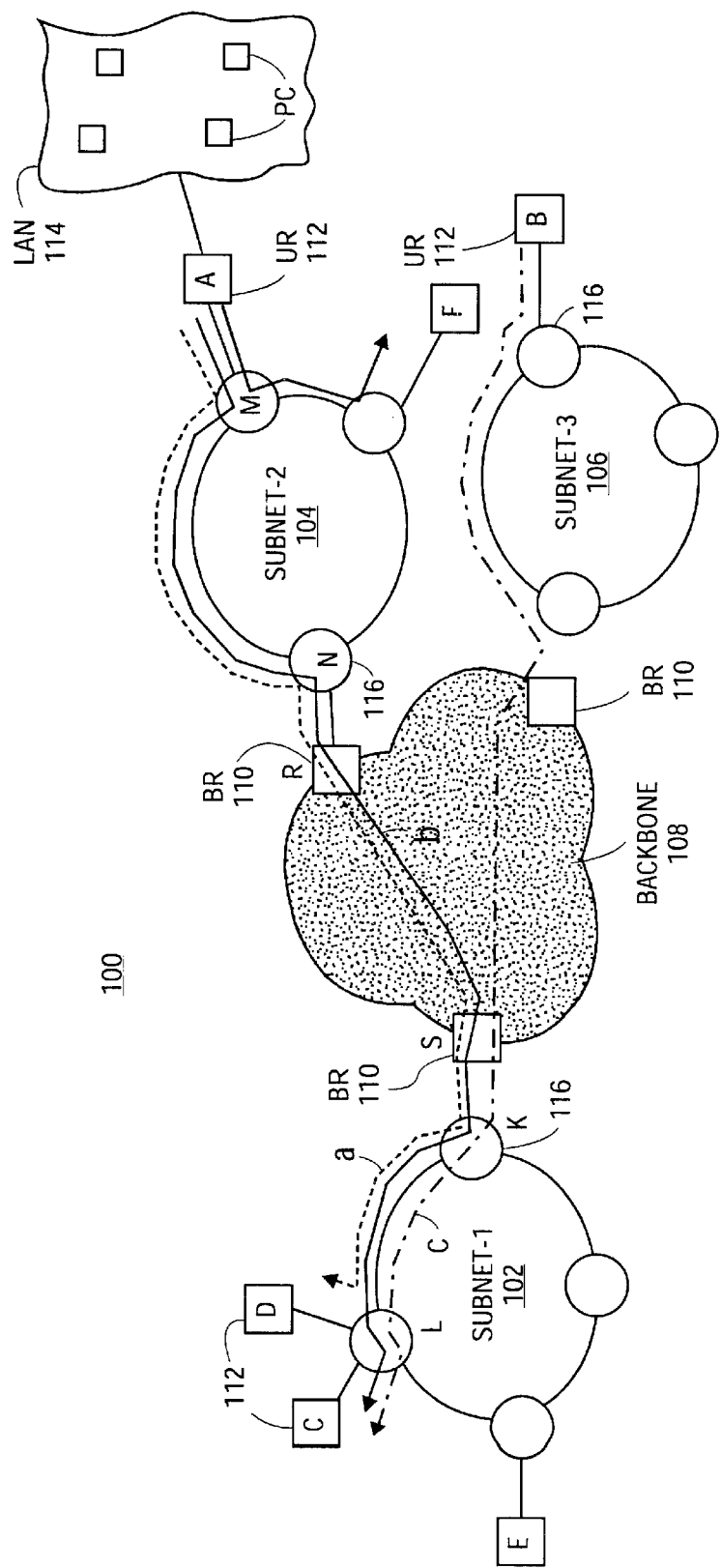
FIG. 1 is a generalized block diagram of a network in accordance with the invention.

FIG. 1 shows a network 100 having a plurality of subnetworks ("subnets"), three of which are shown, subnet-1 102, subnet-2 104, and subnet-3 106. Each of the subnets are attached to the backbone 108 of network 100 via a border router (BR) 110, such as S and R. Backbone 108 is composed of multiple links between multiple switches and is simply shown as a "cloud" in FIG. 1 for clarity of illustration. Each subnet is further in communication with various user routers (URs) 112, such as A, B, C, D, E, and F shown in FIG. 1. Each user router, in turn, is coupled to one or more local area networks (LANs) 114 or virtual LANs (VLANs). Only one LAN 114 is shown in FIG. 1 in order to preserve the clarity of the illustration. Each UR 112 and each BR 110 is connected to the respective subnet via various subnet nodes (switches) 116, such as those shown at K, L, M, and N in FIG. 1. As shown, each subnet, through a respective BR 110, serves as an access point to the rest of network 100 for the URs 112 and the LANs attached to the URs.

In one embodiment of the invention, the network of FIG. 1 is an IP-based network. As such, the network communicates data through the use of IP packets: data to be sent is divided into manageable segments, each of which is given an IP header 200, shown in FIG. 2. IP header 200 is generally composed of a 20-byte fixed portion 202 and a variable length optional portion 204. The fields of the IP header are generally well-known in the art, so only a few are discussed here. Among its fields, the IP header 200 includes a source address 208, specifying the host computer from which the packet originates, and a destination address 210, specifying the destination host computer of the packet. As well as source and destination addresses, the IP header also includes an 8-bit "type of service" field 206.

The "type of service" field 206 frequently includes bits, which specify a class of service to be provided for the packet. For instance, packets may be classified as e-mail, voice transmission, or web browsing, and then transmitted according to a service specific to the class (e.g., voice transmission generally requires priority transfer over web browsing). In many embodiments, these classification bits are called differentiated services, or DiffServ, bits. Frequently, there are three DiffServ bits, defining up to eight classes of services.

Alternatively, another embodiment of the invention may implement Multiprotocol Label Switching (MPLS). MPLS is designed to improve network routing speeds by appending a short, fixed-length label to the IP header. This label acts as a shorthand representation of the IP header in the same way a ZIP code is shorthand for a street and city. The MPLS label specifies the next hop of the packet and its class of service.

Because the class of service of a packet can be represented with DiffServ bits, an MPLS label, other bits in the IP header, or other information representative of the bits in the IP header, these types of bits will generally be referred to herein as Class of Service (COS) bits. Further because an MPLS label essentially encapsulates an IP header, representing information contained in the IP header, for purposes herein an MPLS label is considered part of the IP header.

Generally in routing packets, when a packet arrives at a router or other switch (generically referred to herein as nodes) the node consults a routing table to determine the next node to which to send the packet, frequently based upon the IP destination address 210. In accordance with an embodiment of the invention, subnet nodes will also classify the packets for a particular level of service in accordance with the COS bits found in the packet header, and, in some circumstances, further based upon the source address and/or the destination address.

Figure 4:
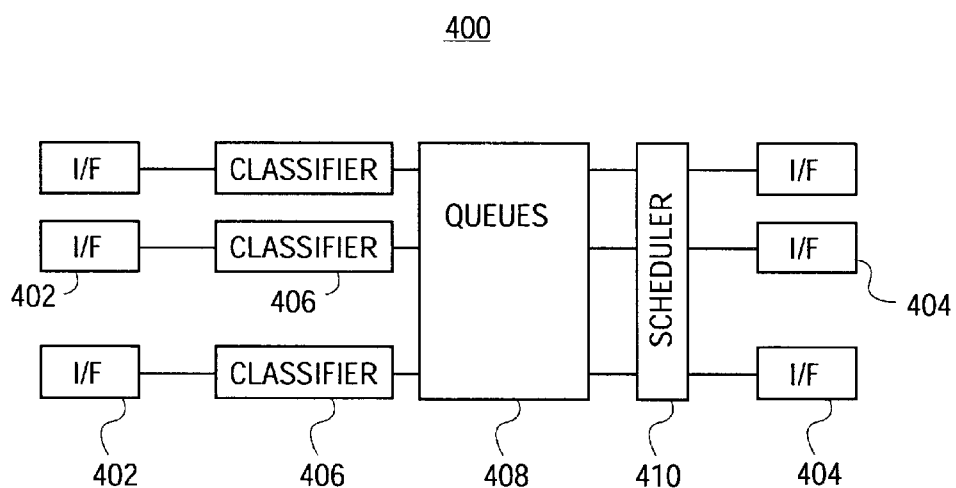
FIG. 4 is a block diagram illustrating a node in accordance with an embodiment of the invention.

An embodiment of a node 400 in accordance with the invention is shown in FIG. 4. The node 400 has one or more input ports and interfaces 402 and one or more output ports/interfaces 404. A classifier 406 is in communication with a respective input port 402 and is in communication with switch and queuing logic 408 in which the packets are queued. A scheduler 410 is coupled to switch and queuing logic 408 and schedules the packets for transmission on an appropriate output port 404. Other embodiments of the invention may have a single classifier to handle traffic from all input ports 402.

In accordance with an embodiment of the invention, classification of packets for QoS purposes is supported in each of four scenarios: two for communications intra-subnet and two for communications inter-subnet. Each of these scenarios may be thought of as a type of QoS service offered, and each is described below. In accordance with an embodiment of the invention, for each scenario, classification of services is performed by a classifier 406 in the node first accessed in the subnet by a router (the subnet access point) in accordance with FIG. 3. Such a classifier could be implemented with software, hardware, firmware, or any combination thereof as will be understood by those of skill in the art. As well, for the examples described below, it is assumed that for each connection between routers, eight classes of services are available, although other embodiments of the invention will offer more or fewer classes.

Further, in each of these scenarios, the objective is to offer QoS to flows between URs and one BR or between URs, which will usually entail identifying the destination address of the designated router. To identify the destination UR from the destination IP address, a node must use a longest prefix match. Such a match uses the fact that the hosts attached to the same UR have addresses that have one out of a small number of possible prefixes. For instance, these addresses might start with one of three specific 24-bit strings d, e, or f, or a specific 22-bit string g. Addresses attached to another UR would not have a 24-bit prefix d, e, or f nor a 22-bit prefix g. Using this property of the addresses, the node can then search a table that contains the strings d, e, f, g to see if the destination address of a packet shares the prefix d, e, f, or g and determine if it corresponds to that particular UR. A similar mechanism can be used to identify the source UR from the source IP address.

Intra-subnet

Figures 2, 3:
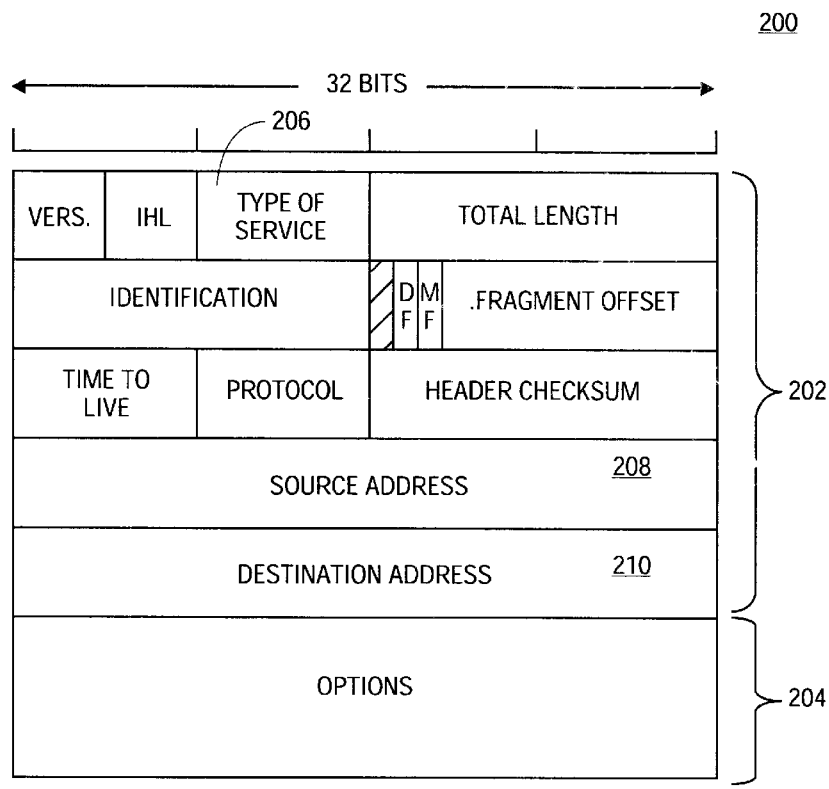
FIG. 2 is a block diagram of an IP header.
FIG. 3 is a table illustrating the QoS services that can be provided with a system and method in accordance with the invention and the basis of classification for each.

Intra-subnet/UR-BR communications. Each subnet is capable of implementing eight QoS classifications for a connection between a UR and a BR, e.g., between A and R. Referring to FIG. 3, when access is made to subnet-2 by a UR (e.g., A), the subnet node first accessed (e.g., M) classifies the packets received from the source UR (e.g., A) for a particular level of QoS. Classification is made based on the incoming port (P) and the COS bits. If instead access is made to the subnet at a BR (e.g., R), then the first subnet node accessed (e.g., N) will classify the packets received from the BR based upon the IP destination address (IPDest) and the COS bits found in the header. Node N determines the destination UR of the packet using the IP destination address (IPDest), typically made using a longest prefix match technique previously described in one embodiment of the invention (the destination address itself usually specifies the specific destination host computer, not the UR address).

Many subnetworks are also capable of routing packets to virtual LANs (VLANs). Membership to a VLAN is defined administratively independent of the physical network topology. Hence, two computers may each be part of distinct LANs physically, but belong to the same VLAN, making it essentially appear that they are part of the same LAN. When VLANs are used, and if the routers are VLAN-compatible, packets are typically augmented with a four-byte field called a virtual LAN tag (VLAN tag). The VLAN tag includes a 12-bit VLAN-ID used to identify the VLAN to which the packet is directed. VLAN tags are used generally for routing the packet within a particular subnet. Therefore, when a subnet node receives an IP packet that has a VLAN tag augmented to the IP packet (e.g., by the UR or the BR), the node can route the packet within the subnet in accordance with the VLAN tag. Nonetheless, not all subnets support VLAN. Still, for those subnets that do support VLAN, an alternative embodiment of the invention can use the VLAN-ID, rather than the IP destination address (IPDest), for classifying packets destined for that particular subnet, as shown in FIG. 3. Since the VLAN-ID carries destination information, it is still considered to carry IP header information in accordance with the invention similar to an MPLS tag.

Intra-subnet/communications between any two routers. In one embodiment of the invention, a second type of service can be defined to allow the provision of QoS between any two routers on a particular subnet (e.g., between A and F, or between A and R). In this scenario, classification again occurs at the first node accessed on the subnet. The first accessed subnet node will classify the packet received from the source router, when the source router is a UR, based upon the incoming port (P), the IP destination address (IPDest) or VLAN-ID (if supported), and the COS bits. When the source router is a BR, packets received will be classified in a manner similar to that described before, i.e., the subnet node first accessed by the border router classifies the packets according to the IP destination address (IPDest) or VLAN-ID, and the COS bits.

As shown by the classifications made as described above, only the minimum required amount of information is considered in an embodiment of the invention. For instance, when services are offered solely for QoS between subnet URs and a single subnet BR, the IP destination address (IPDest) need not be considered for packets flowing from a UR to the BR, since there is only one BR (thus the destination is always known). In contrast, for packets flowing from the BR to a UR, the IP destination address (IPDest) (or VLAN-ID) must be considered to properly classify the packets since there are multiple URs, each having eight classifications for communication with the BR. Similarly, when QoS is provided between any two routers in the subnet, since there are multiple routers attached to the subnet, the destination address needs to be considered for classification.

Inter-subnet

While the above-described two scenarios deal with communications intra-subnet, once packets flow between subnets, classification becomes more problematic since there can be multiple classes for communications between at least several thousands of routers. If all use only three COS bits, then distinguishing flows becomes difficult. For instance, FIG. 1 shows several end-to-end connections: connection a (between A and D), connection b (between A and C), and connection c (between B and C). The ability to distinguish and classify these connections becomes difficult when, for instance, the data streams for the connections flow along the same path in a subnet, e.g., connections b and c both flow between nodes K and L to UR-C. Classifying the connections and distinct data streams for the connection enables the provision of QoS to each connection, ensuring that no data stream usurps the available bandwidth. If packets that each belong to one of multiple streams are not separated into their respective multiple flows, QoS might suffer as one overactive flow can deny service to the others. For instance, classification would enable subnet-1 to distinguish the 16 service classifications of connections b and c to allow allocation of appropriate resources (as is understood in the art) to provide the corresponding QoS. Thus, in accordance with one embodiment of the invention, two additional types of service can be provided inter-subnet: asymmetric services between any two routers attached to different subnets, and symmetric services between any two routers attached to different subnets.

Inter-subnet/asymmetric. For asymmetric services, the subnet node (e.g., M) at the source router classifies packets it receives based on the incoming port P, the IP destination address (IPDest), and the COS bits (note that the VLAN-ID can only be used for routing within a subnet and would not be available for use here). The subnet node (e.g., K) at the BR of the destination subnet classifies the packets it receives based upon the IP destination address (IPDest) or VLAN-ID and the COS bits in the IP packet.

This service is referred to as "asymmetric" because the source subnet differentiates the connections/classes of those packets that have the same COS bits but go to different URs. Nonetheless, the destination subnet, since it only evaluates IPDest (or VLAN-ID) and the COS bits, is not able to differentiate packets that originate from different source URs. For instance, if 2 Mbps are provided for voice packets from S to C, all voice packets from either A or B will share the available 2 Mbps. Therefore, it is assumed that since classification is made at the source subnet, the packets are sent at the correct rate for that particular classification. Nonetheless, a form of traffic policing (as will be understood by those of skill in the art) will be implemented in some embodiments in order to further assure QoS for this type of service and avoid usurpage of bandwidth.

Inter-subnet/symmetric. To provide full, guaranteed QoS, symmetric services can be provided in accordance of the invention, providing classification at both the source and destination subnets. To do so, the subnet node (e.g., A) at the source UR classifies the packets received based upon the incoming port (P), the IP destination address (IPDest), and the COS bits much the same as with asymmetric services. In contrast to the asymmetric services, however, the node (e.g., K) connected to the BR at the destination subnet classifies packets received based upon the IP destination address (IPDest) or VLAN-ID, the IP source address (IPSrc), and COS bits. Node K determines the destination UR (on the same subnet) and the source UR (from the remote subnet) based upon the IP addresses provided in the IP header, typically using a longest prefix match technique. In this manner, a particular rate, e.g., 1 Mbps, can be provided to voice packets (for example) from A to C and a particular rate, e.g., 1 Mbps, can be provided for voice packets (for example) from B to C.

Therefore, in accordance with the invention, connections can be differentiated that arrive at a subnet from distinct remote URs. Thus, connections such as connection b and connection c and their respective classes of service can be distinguished and distinct QoS can be made available to each. It should be noted that the source UR address (and not the source host computer address) is used for classification to account for scalability, so that not too many flows have to be differentiated in the network.

As shown in FIG. 3, classification is made at the node accessed by a UR partially on the basis of the incoming port (P). In alternative embodiments, P could be replaced with IPSrc. Nonetheless, using P is generally easier when possible, especially when a classifier is associated with a specific port.

In addition, although the classifications demonstrated are based upon a minimal amount of required information (shown in FIG. 3), other embodiments could include additional information. For instance, there is no reason why classification in all levels of service could not be made by always considering IPDest, IPSrc, and COS.

Therefore, an embodiment of the invention provides a way to classify IP packets using only the information in the IP headers. Once the classification is known, the nodes can take the steps necessary to implement the appropriate QoS for the packets, as is known in the art. As well, a system in accordance with the invention is scalable and easy to implement. It offers the same type of QoS as ATM, but does so for IP-based networks.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. In a network including a plurality of subnetworks, a method of providing quality of service for packets transmitted inter-subnetwork and for packets transmitted intra-subnetwork, comprising:
   receiving a packet at a first subnetwork of the plurality of subnetworks;
   determining whether the received packet is an inter-subnetwork communication or an intra-subnetwork communication;
   classifying the received packet into one of a plurality of quality of service classes based upon whether the packet is an inter-subnetwork communication or an intra-subnetwork communication and based upon the packet's header information;
   allocating resources necessary to provide a quality of service corresponding to the classified quality of service class; and
   forwarding the packet to a next destination according to the packet's classified quality of service class.

2. The method of claim 1, wherein the header information includes a source address, a destination address, and class of service bits.

3. The method of claim 2, wherein the destination address is represented by a virtual local area network (VLAN) identifier (ID).

4. The method of claim 1, wherein at least a portion of the packet's header information is included in an Multiprotocol Label Switching (MPLS) tag.

5. A method of classifying packets in a network including a plurality of subnetworks, comprising:
   receiving a packet at a first subnetwork of the plurality of subnetworks;
   determining whether the packet is an inter-subnetwork communication or an intra-subnetwork communication;
   classifying the packet to provide an appropriate level of quality of service based on the packet's destination address and class of service identifier if the packet is an intra-subnetwork communication;
   classifying the packet to provide an appropriate level of quality of service based on the packet's source address, class of service identifier, and destination address if the packet is an inter-subnetwork communication; and
   allocating resources necessary to provide the appropriate level of quality of service.

6. The method of claim 5, wherein classifying the packet to provide an appropriate level of quality of service based on the packet's source address, class of service identifier, and destination address if the packet is an inter-subnetwork communication comprises classifying the packet to provide an appropriate level of quality of service based on the packet's source address, class of service identifier, and a Virtual Local Area Network identifier (VLAN-ID) if the packet is an inter-subnetwork communication.

7. The method of claim 5, wherein the destination address and said class of service identifier are represented in an Multiprotocol Label Switching (MPLS) tag.

8. A method of classifying packets in a network including a plurality of subnetworks comprising:
   receiving a packet at a first subnetwork of the plurality of subnetworks;
   determining whether the packet is an inter-subnetwork communication or an intra-subnetwork communication;
   classifying the packet to provide an appropriate level of quality of service based on the packet's class of service identifier and an incoming port at which the packet was received if the packet is an intra-subnetwork communication;
   classifying the packet to provide an appropriate level of quality of service based on the packet's class of service identifier, an incoming port at which the packet was received, and a Virtual Local Area Network identifier (VLAN-ID) if the packet is an inter-subnetwork communication; and
   allocating resources necessary to provide the appropriate level of quality of service.

9. A network, comprising:
   a backbone;
   a plurality of border routers;
   a plurality of user routers; and
   a plurality of subnetworks, wherein each subnetwork includes a plurality of subnetwork nodes,
   wherein each subnetwork node communicates with the backbone via a one or more of the plurality of border routers,
   wherein each subnetwork node communicates with one or more Local Area Networks (LANs) or Virtual Local Area Networks (VLANs) via one or more of the plurality of user routers,
   wherein each subnetwork node includes a classifier to classify packets for quality of service based on whether the packets are received from a border router or a user router and whether the received packets are intra-subnetwork communications or inter-network communications.

10. The network of claim 9, wherein the classifier to classify intra-subnetwork packets received at the node from a border router based on the packet's destination address and class of service identifier.

11. The network of claim 10, wherein the classifier to further classify inter-subnetwork packets received at the node from a user router based on the packet's destination address, class of service identifier, and an incoming port of the node at which the packet was received.

12. The network of claim 11, wherein the classifier to further classify intra-subnetwork packets received at the node from a user router based on the packet's class of service identifier and an incoming port of the node at which the packet was received.

13. The network of claim 12, wherein the classifier to further classify inter-subnetwork packets received at the node from a border router based on the packet's source address, destination address, and class of service.

14. The network of claim 12, wherein the classifier to further classify inter-subnetwork packets received at the node from a border router based on the packet's source address, class of service, and a VLAN identifier (ID).

15. An article of manufacture comprising a machine accessible medium including content that when accessed by a machine causes the machine to:

receive a data packet at a first subnetwork in a network including a plurality of subnetworks;

determine whether the data packet is an inter-subnetwork communication or an intra-subnetwork communication;

classify the data packet into a quality of service class based on whether the data packet is an inter-subnetwork communication or an intra-subnetwork communication and based on the data packet's header information;

allocate resources necessary to provide a quality of service corresponding to the classified quality of service class; and forward the data packet to a next destination according to the data packet's classified quality of service class.

16. The article of manufacture of claim 15, wherein the header information includes a source address, a destination address, and class of service bits.

17. The article of manufacture of claim 16, wherein the destination address is represented by a Virtual Local Area Network identifier (VLAN ID).

* * * * *